US010376103B2

(12) United States Patent
Rizzuto

(10) Patent No.: US 10,376,103 B2
(45) Date of Patent: Aug. 13, 2019

(54) COCKTAIL SHAKER AND CHILLER APPARATUS

(71) Applicant: Conair Corporation, Stamford, CT (US)

(72) Inventor: Leandro P. Rizzuto, Sheridan, WY (US)

(73) Assignee: Conair Corporation, Stamford, CT (US)

(\*) Notice: Subject to any disclaimer, the term of this patent is extended or adjusted under 35 U.S.C. 154(b) by 268 days.

(21) Appl. No.: 15/180,859

(22) Filed: Jun. 13, 2016

(65) Prior Publication Data

US 2017/0354298 A1    Dec. 14, 2017

(51) Int. Cl.
*A47J 43/27* (2006.01)
*B65D 81/18* (2006.01)
(Continued)

(52) U.S. Cl.
CPC .......... *A47J 43/27* (2013.01); *A23L 2/00* (2013.01); *A23L 3/364* (2013.01);
(Continued)

(58) Field of Classification Search
CPC ..... A47G 19/2288; A47J 43/27; A47J 31/005; A47J 41/00; A47J 41/0038; A23L 2/00;
(Continued)

(56) References Cited

U.S. PATENT DOCUMENTS 288,775 A * 11/1883 Peterson ................ A47J 43/27
220/568

740,446 A * 10/1903 Lattard ................... A47J 43/27
165/154
(Continued)

FOREIGN PATENT DOCUMENTS

WO    201237184 A2    3/2012
WO    201374950 A1    5/2013
WO    201517645 A1    2/2015

OTHER PUBLICATIONS

Notification of Transmittal of International Search Report and the Written Opinion of the International Searching Authority, or the Declaration dated Aug. 7, 2017.

*Primary Examiner* — Gideon R Weinerth
(74) *Attorney, Agent, or Firm* — Lawrence Cruz, Esq.; Ryan, Mason & Lewis, LLP

(57) ABSTRACT

An apparatus for accommodating a beverage includes an outer vessel defining a vessel cavity for receiving a cooling agent, a container having a lid and a beverage receptacle and a port. The lid is configured for engagement with the outer vessel to releasably mount the container to the outer vessel. The beverage receptacle defines a receptacle chamber for accommodating a liquid beverage for consumption by a user. The receptacle chamber is isolated from the vessel cavity. The beverage receptacle comprises a thermal conductive material and is at least partially disposed within the vessel cavity of the outer vessel when the container is mounted to the outer vessel whereby thermal energy is transferred from the cooling agent to the liquid beverage. The port defines a port opening in fluid communication with the receptacle chamber to permit distribution of the liquid beverage to the user. The outer vessel and mounted container may be positioned within a freezing apparatus to freeze the cooling agent, e.g., water about the beverage receptacle.

10 Claims, 5 Drawing Sheets

(51) Int. Cl.
  *B65D 53/02*    (2006.01)
  *A23L 2/00*     (2006.01)
  *B01F 13/00*    (2006.01)
  *B01F 15/06*    (2006.01)
  *B65D 43/02*    (2006.01)
  *B65D 47/06*    (2006.01)
  *C12G 3/04*     (2019.01)
  *A23L 3/36*     (2006.01)
  *F25D 3/08*     (2006.01)

(52) U.S. Cl.
  CPC ........ *B01F 13/0022* (2013.01); *B01F 15/065* (2013.01); *B65D 43/02* (2013.01); *B65D 47/06* (2013.01); *B65D 53/02* (2013.01); *B65D 81/18* (2013.01); *C12G 3/04* (2013.01); *A23V 2002/00* (2013.01); *B01F 2015/061* (2013.01); *B01F 2215/007* (2013.01); *B01F 2215/0022* (2013.01); *F25D 3/08* (2013.01); *F25D 2303/08* (2013.01); *F25D 2303/0831* (2013.01)

(58) Field of Classification Search
  CPC .... A23L 3/364; B01F 13/0022; B01F 15/065; B01F 2015/061; B01F 2215/007; B01F 15/00512; B65D 43/02; B65D 47/06; B65D 53/02; B65D 81/18; C12G 3/04; F25D 2303/08; F25D 2303/081; F25D 2303/0831; F25D 2303/0842; F25D 2303/0843; F25D 2331/808; F25D 2500/02; F25D 3/06; F25D 3/08; F25D 31/002; F25D 2303/082; F25D 2303/0821; F25D 2303/083; F25D 2303/0844; F25D 2303/0845; F25D 2331/803; F25D 31/007; Y10S 215/08
  USPC ............. 220/568, 592.17; 336/130; 366/130, 366/129, 147; 62/457.4, 529, 400; 222/146.6, 189.07; 206/219; 99/277.1; D7/300, 300.1, 300.2
  See application file for complete search history.

(56) References Cited

U.S. PATENT DOCUMENTS

| | | | | |
|---|---|---|---|---|
| 999,672 A * | 8/1911 | Puffer | ...... | A23G 9/227 220/592.14 |
| 1,094,712 A * | 4/1914 | Gale | ...... | A47J 43/27 220/23.87 |
| 1,532,681 A * | 4/1925 | Bryce | ...... | A47J 43/27 220/568 |
| 1,657,927 A * | 1/1928 | Heinzen | ...... | A47J 43/27 220/506 |
| 1,703,334 A * | 2/1929 | Bennett | ...... | A47J 43/27 215/320 |
| 1,721,311 A * | 7/1929 | Muenchen | ...... | A23G 9/08 126/246 |
| 1,750,334 A * | 3/1930 | Stern | ...... | A47J 43/27 220/506 |
| 1,751,315 A * | 3/1930 | Fox | ...... | A47J 43/27 220/521 |
| 1,765,129 A * | 6/1930 | Cooke | ...... | A47J 43/27 215/40 |
| 1,954,369 A * | 4/1934 | Solomon | ...... | A47J 43/27 215/6 |
| 1,966,611 A * | 7/1934 | Cobel | ...... | A47J 43/27 210/244 |
| 2,072,630 A * | 3/1937 | Ferry | ...... | B65D 51/28 206/570 |
| 2,086,073 A * | 7/1937 | Francescon | ...... | C12G 3/065 215/6 |
| 2,090,320 A * | 8/1937 | Amick | ...... | A47J 43/27 215/12.1 |
| 2,100,172 A * | 11/1937 | Riegel | ...... | A47J 43/27 220/568 |
| 2,191,434 A * | 2/1940 | Alder | ...... | A47J 43/27 137/259 |
| 2,288,044 A * | 6/1942 | Stemme | ...... | A47G 19/2288 215/12.1 |
| 2,468,661 A | 4/1949 | Gladstone | | |
| 2,759,337 A * | 8/1956 | Katz | ...... | F25D 5/02 206/199 |
| 2,838,916 A * | 6/1958 | Planes Y Sola | ...... | F25D 31/008 62/336 |
| 3,034,305 A * | 5/1962 | Ruggieri | ...... | F25D 3/08 62/371 |
| 3,766,975 A * | 10/1973 | Todd | ...... | A47G 19/2288 126/400 |
| 4,531,383 A * | 7/1985 | Zimmermann | ...... | A47J 41/0044 62/457.4 |
| 4,878,363 A * | 11/1989 | Wells, Sr. | ...... | A47G 19/12 62/460 |
| 5,177,981 A * | 1/1993 | Haas | ...... | A47G 19/2288 62/1 |
| 5,573,141 A * | 11/1996 | Chen | ...... | A47G 19/2288 220/592.17 |
| 5,857,351 A * | 1/1999 | Angus | ...... | A23G 9/08 366/130 |
| 6,035,659 A | 3/2000 | Fernandez | | |
| 6,085,927 A * | 7/2000 | Kusz | ...... | B65D 77/0493 215/6 |
| 6,622,516 B1 * | 9/2003 | Horen | ...... | F25D 3/08 62/457.4 |
| D483,982 S | 12/2003 | Irvine | | |
| D495,186 S | 8/2004 | Poupel et al. | | |
| 6,913,165 B2 | 7/2005 | Linz et al. | | |
| D571,151 S | 6/2008 | Lopez | | |
| 7,810,348 B2 * | 10/2010 | Shewchuk | ...... | F25D 3/08 62/457.1 |
| 8,083,056 B1 * | 12/2011 | Wu | ...... | B65D 25/08 206/221 |
| D663,216 S | 7/2012 | Considine et al. | | |
| D754,999 S * | 5/2016 | Gamelli | ...... | D7/300.1 |
| 9,714,121 B2 * | 7/2017 | Gamelli | ...... | B65D 47/122 |
| D817,683 S * | 5/2018 | Melanson | ...... | D7/300.1 |
| D825,242 S * | 8/2018 | Bosheng | ...... | D7/300.1 |
| 2004/0066705 A1 | 4/2004 | Linz et al. | | |
| 2006/0191283 A1 | 8/2006 | Overgaard | | |
| 2007/0251956 A1 | 11/2007 | Wasserman et al. | | |
| 2008/0023348 A1 | 1/2008 | Herzog et al. | | |
| 2009/0120932 A1* | 5/2009 | McLaughlin | ...... | A47J 43/27 220/212 |
| 2010/0072159 A1 | 3/2010 | Yang | | |
| 2012/0147693 A1 | 6/2012 | Bahlenhorst et al. | | |
| 2012/0273503 A1* | 11/2012 | Yen | ...... | A47J 43/27 220/568 |
| 2013/0098784 A1 | 4/2013 | Spendlow et al. | | |
| 2013/0126369 A1 | 5/2013 | Gamelli | | |
| 2013/0163370 A1 | 6/2013 | Shaifer et al. | | |
| 2014/0312040 A1 | 10/2014 | Gamelli | | |
| 2014/0314937 A1 | 10/2014 | Wang | | |
| 2015/0034658 A1 | 2/2015 | Vastardis | | |
| 2016/0058247 A1 | 3/2016 | Hogan | | |
| 2016/0166115 A1 | 6/2016 | Schlesinger et al. | | |
| 2016/0270600 A1 | 9/2016 | Pappas et al. | | |
| 2017/0354298 A1* | 12/2017 | Rizzuto | ...... | A23L 3/364 |
| 2018/0180352 A1* | 6/2018 | Dickens | ...... | F25D 31/002 |

* cited by examiner

COCKTAIL SHAKER AND CHILLER APPARATUS

BACKGROUND

1. Technical Field

The present disclosure relates to a beverage container apparatus, and, in particular, relates to a cocktail shaker and/or mixer apparatus for cooling and/or mixing a liquid beverage while maintaining the liquid beverage isolated from the cooling agent.

2. Background of Related Art

Cocktail mixers are well known in the art. A conventional mixer includes a cup or vessel which receives ice and a liquid beverage to be consumed by the user. A strainer may be positioned over the cup and the mixer is shaken to mix the components of the beverage and cool the beverage through direct contact with the ice. The beverage is thereafter dispensed into a glass or cup for consumption by the user.

However, conventional cocktail mixers possess drawbacks which detract from their overall usefulness in both preserving the integrity of the beverage and maintaining the beverage at a desired temperature. For example, directly mixing the liquid beverage with ice results in the beverage becoming diluted over a short period of time as the ice melts. In addition, the melted ice will not produce the desired cooling effect of maintaining the beverage at an optimal temperature for consumption, particularly over extended periods of time.

SUMMARY

Accordingly, the present disclosure is directed to a cocktail and/or mixing apparatus for cooling and mixing a beverage. In one embodiment, an apparatus for accommodating a beverage includes an outer vessel defining a vessel cavity for receiving a cooling agent, a container having a lid and a beverage receptacle, and a port. The lid is configured for engagement with the outer vessel to releasably mount the container to the outer vessel. The beverage receptacle defines a receptacle chamber for accommodating a liquid beverage for consumption by a user. The receptacle chamber is isolated from the vessel cavity. The beverage receptacle comprises a thermal conductive material and is at least partially disposed within the vessel cavity of the outer vessel when the container is mounted to the outer vessel whereby thermal energy is transferred from the cooling agent to the liquid beverage. The port defines a port opening in fluid communication with the receptacle chamber to permit distribution of the liquid beverage to the user. The outer vessel and mounted container may be positioned within a freezing apparatus to freeze the cooling agent, e.g., water, about the beverage receptacle.

The beverage receptacle may be disposed in spaced relation relative to the outer vessel when the container is mounted to the outer vessel such that the cooling agent at least partially surrounds the beverage receptacle. The beverage receptacle may be coaxially arranged within the outer vessel when the container is mounted to the vessel to thereby define an annular gap between the vessel and the beverage receptacle for accommodating the cooling agent.

The port may be configured to extend outwardly from the lid of the container external of the vessel cavity when the container is mounted to the vessel. A cap may be provided and configured to releasably couple to the port to enclose the port opening. The lid of the container may include an O-ring seal configured to establish a sealing relationship with an interior of the outer vessel when the container is mounted to the vessel.

A method for treating a beverage is also disclosed. The method includes:

at least partially filling a vessel with a cooling fluid;

mounting a container to the vessel whereby a beverage receptacle of the container is at least partially disposed within the vessel and in contact with the cooling fluid;

introducing a beverage within a chamber of the beverage receptacle, the interior of the chamber being isolated from the cooling fluid within the vessel; and permitting thermal energy to transfer the cooling fluid within the vessel through a wall of the chamber to the beverage in order to cool the beverage to a desired temperature.

The method may include freezing the cooling fluid after the container is mounted to the vessel. The beverage receptacle may comprise a wall of thermal conductive material whereby permitting the transfer of cooling thermal energy to transfer is effected through thermal conduction of the thermal energy through the wall of the beverage receptacle.

The method may include securing a cap to a fluid port of the container to enclose the chamber receptacle, and optionally mixing contents of the beverage within the chamber by manually shaking the apparatus.

The method may include selectively pouring the beverage through a fluid port of the container over, e.g., a predetermined time period, while the cooling fluid maintains the beverage at the desired temperature.

One of the benefits of the apparatus of the present disclosure is that no ice cubes are mixed with the beverage with conventional devices and, therefore, the beverage is never diluted. Another benefit is that the shaker can be used as a serving vessel that keeps the beverage cool and the user can pour out a predetermined volume of beverage at a time as the beverage is consumed. For example, restaurants and bars can individually serve customers with the subject apparatus, and the beverage will remain cold while the user can selectively refill his/her glass. This is especially useful, e.g., in warm weather or tropical climates.

Other advantages of the present disclosure will be appreciated from the following description.

BRIEF DESCRIPTION OF THE DRAWINGS

Various embodiments of the present disclosure are described hereinbelow with references to the drawings, wherein.

DETAILED DESCRIPTION

Referring now in detail to the drawings and, in particular, to FIGS. 1-6, the cocktail shaker and chiller apparatus in accordance with the principles of the present disclosure is illustrated. The apparatus 10 provides a system and methodology to cool and maintain a beverage isolated from a cooling agent such as ice thereby avoiding dilution of the beverage with the melting ice and an undesired increase in the beverage's temperature. Moreover, the apparatus 10 will effectively cool and maintain the beverage at a desired temperature even when subjected to warm climates and extended periods of time. Thus, the beverage is maintained at the desired cold temperature and can be selectively poured without risk of dilution or temperature increase or change during relatively long periods of use.

Figure 1:
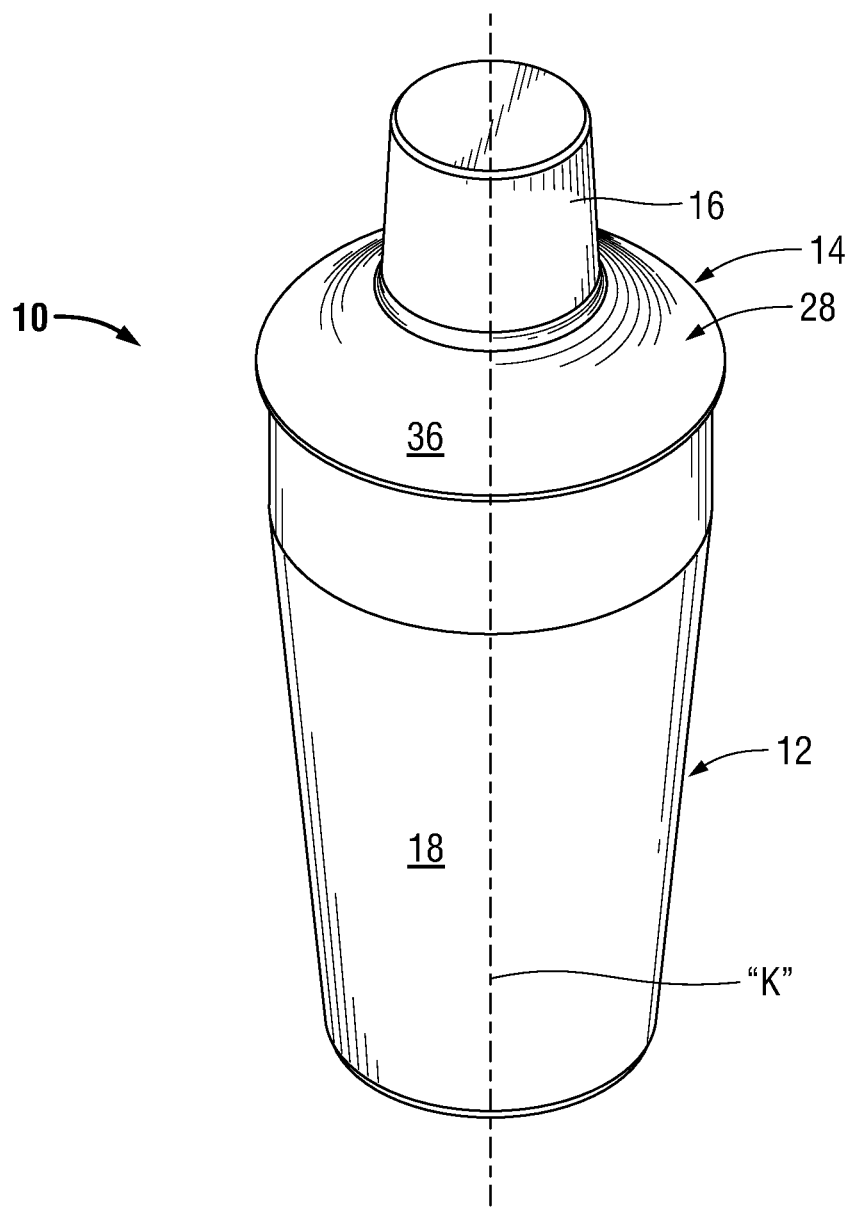
FIG. 1 is a perspective view of the cocktail mixer and shaker apparatus in accordance with the principles of the present disclosure.
Figure 2:
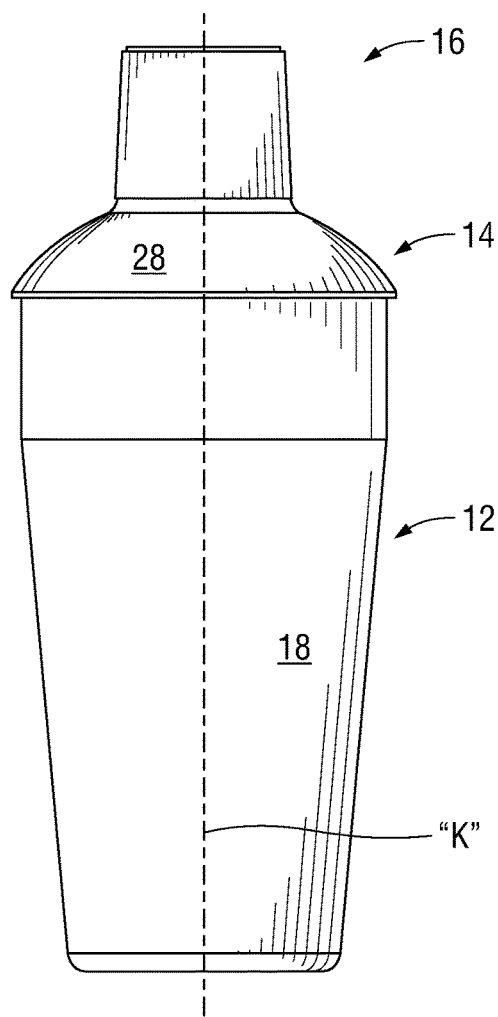
FIG. 2 is a side plan view of the apparatus of FIG. 1.
Figure 3:
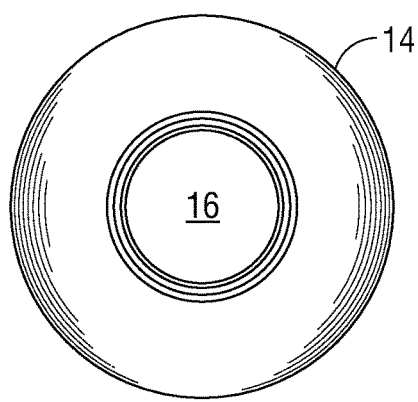
FIGS. 3-4 are top and bottom plan view of the apparatus of FIG. 1.
Figure 4:
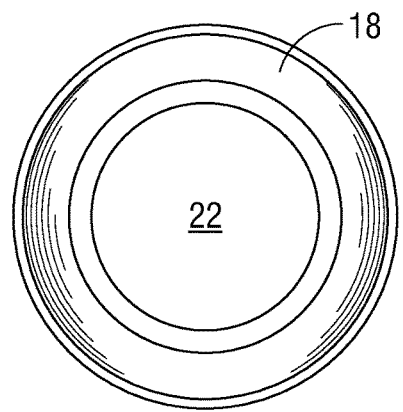
Figure 5:
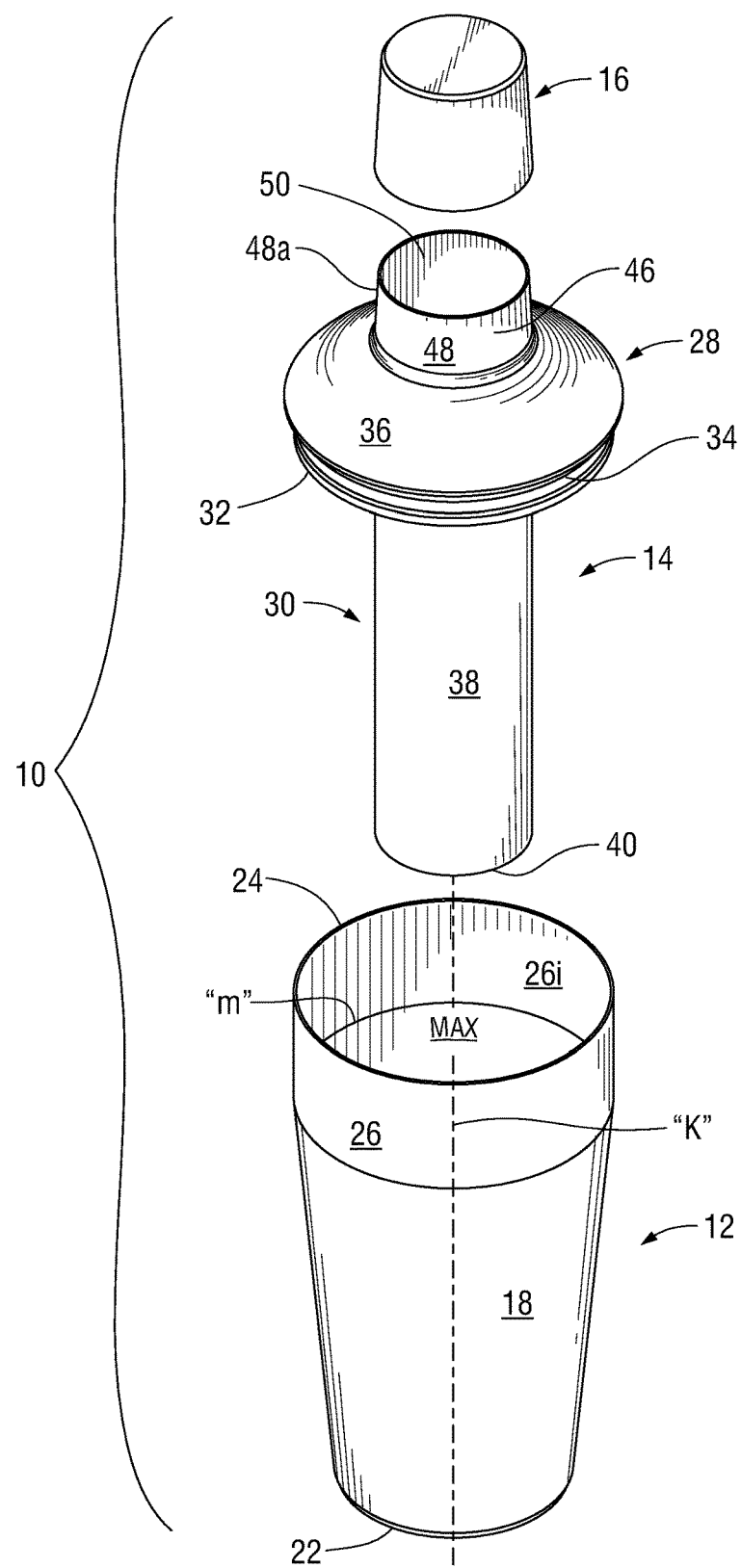
FIG. 5 is an exploded perspective view of the apparatus illustrating the outer vessel, the container for at least partial positioning within the outer vessel, and the cap.
Figure 6:
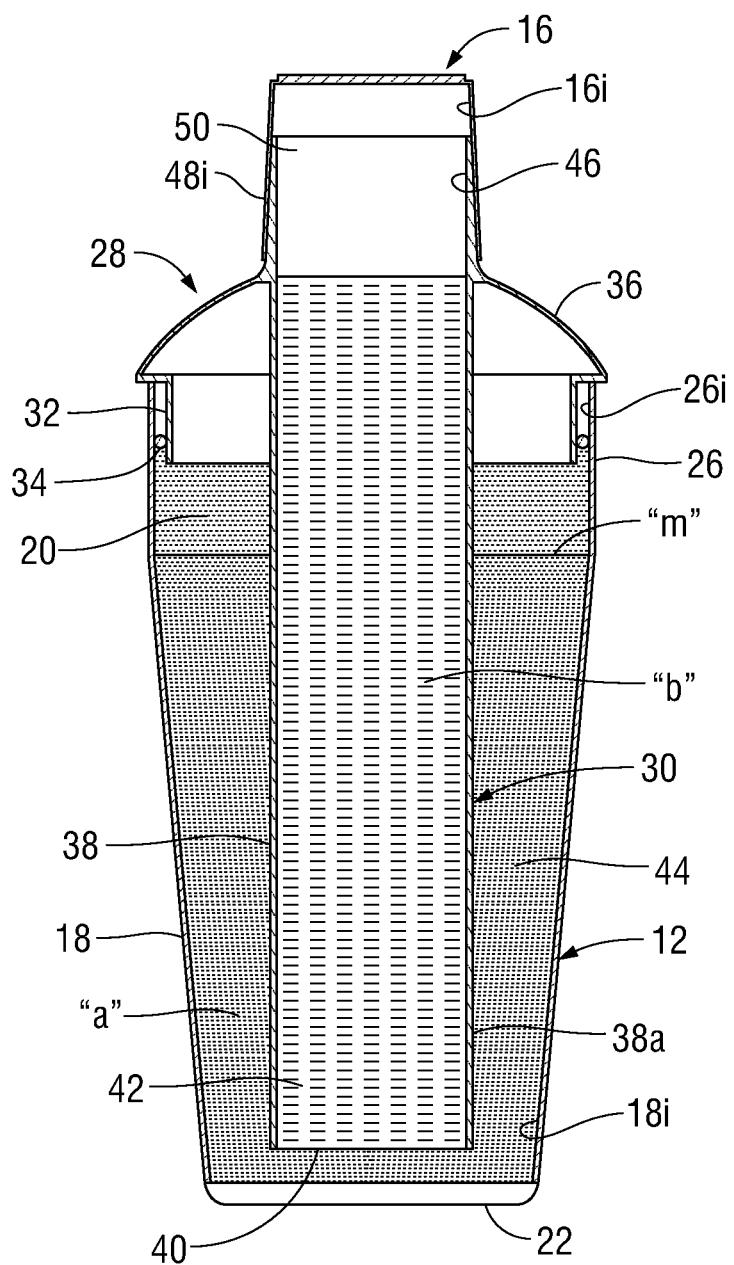
FIG. 6 is a side cross-sectional view of the apparatus in an assembled condition illustrating the cooling fluid encapsulating the beverage receptacle of the container and the liquid beverage within the receptacle chamber.

With reference to FIGS. 5-6, in conjunction with FIGS. 1-4, the apparatus 10 includes an outer vessel or cup 12, a container 14 and a cap 16. The outer vessel 12 includes a vessel wall 18 defining a hollow vessel cavity 20 and arranged about a central longitudinal axis "k" extending along the length of the vessel wall 18. The outer vessel 12 defines a vessel bottom wall 22 and an opposed open end 24 leading into the vessel cavity 20. The vessel wall 18 may be frusto-conical in shape along at least a portion of its length, e.g., along a majority of its length from the vessel bottom wall 22 toward the open end 24. The upper segment 26 of the vessel wall 18 adjacent the open end 24 may be generally cylindrical. Other configurations for the vessel wall 18 are also envisioned. The vessel cavity 20 is dimensioned to receive a cooling agent, e.g., a cooling liquid or fluid such as water or any other suitable fluid capable of storing and releasing thermal energy. The cooling agent may be water or other suitable fluid, liquid or gas, such as, e.g., liquid nitrogen. The cooling agent may include water which can assume a frozen or solid state (turns to ice) when subjected to a predetermined freezing temperature. The inner wall surface 18i of the vessel wall 18 may include indicia "MAX" to assist the user in filling the vessel cavity 20 to the "MAX" filling line "m" with the desired volume of cooling agent.

With specific reference to FIGS. 5-6, the container 14 is releasably mountable to the outer vessel 12 and includes a lid 28 and a beverage receptacle 30 depending from the lid 28. The lid 28 includes an insertion segment 32 which is generally cylindrically shaped and dimensioned for reception within the upper, cylindrical segment 26 of the vessel wall 18. One or more O-ring seals 34 may be positioned about the circumference or periphery of the insertion segment 32. The insertion segment 32 and/or the O-rings 34 are configured to establish a sealing relationship with the interior wall surface 26i of the cylindrical segment 26 of the vessel wall 18 upon mounting of the container 14 to the outer vessel 12. These components also establish or facilitate in establishing the releasable connection of the container 14 to the outer vessel 12 through, e.g., a friction fit. Other mechanical means for releasably connecting the lid 28 and the outer vessel 12 are envisioned, and are inclusive of screw threading, bayonet coupling snap fit relation, etc. The lid 28 also defines an outer segment 36 having a diameter or cross-sectional dimension greater than the outer vessel 12 adjacent the open end 24 to rest against the vessel wall 18 upon mounting of the components.

The beverage receptacle 30 is secured to the lid 28 through conventional methodologies. The beverage receptacle 30 and the lid 28 may be monolithically formed. The beverage receptacle 30 includes an outer receptacle wall 38 and a receptacle bottom wall 40, which collectively define a receptacle chamber 42 for accommodating the beverage. The outer receptacle wall 38 is generally cylindrically-shaped although other shapes are envisioned. The beverage receptacle 30 is coaxially arranged within the outer vessel 12 and relative to the central longitudinal axis "k" when the container 14 is mounted to the outer vessel 12 to thereby define an annular or ring-shaped gap 44 between the outer surface 38a of the receptacle wall 38 and the inner wall surface 18i of the vessel wall 18. This gap or space 44 accommodates the cooling agent "a" within the vessel cavity 20 (FIG. 6) displaced upon mounting of the container 14 to the outer vessel 12. Thus, the cooling agent completely surrounds the receptacle chamber 42 along the receptacle wall 38 which enhances transfer of thermal energy from the cooling agent "a" to the beverage "b" within the receptacle chamber 42. In addition, the receptacle bottom wall 40 is also spaced relative to the vessel bottom wall 22 to accommodate cooling agent beneath the bottom wall 40 to further enhance transfer of thermal energy.

The container 14 further includes a port 46 extending from the lid 28 in a longitudinal direction opposite the direction of the beverage receptacle 30. The port 46 may or may not be a component of the beverage receptacle 30. In one embodiment, the port 46 and the beverage receptacle 30 are monolithically formed. The port 46 includes a port wall 48 defining a port opening 50 in fluid communication with the receptacle chamber 42 for dispensing of the liquid beverage for consumption by the user. The outer surface 48a of the port wall 48 may have a slight taper inwardly relative to the longitudinal axis "k" away from the lid 28. Other configurations are also envisioned.

The cap 16 is removably positionable over the port 46 of the container 14 to enclose the port opening 50 and thus, the receptacle chamber 42. The cap 16 may be any configuration. In one embodiment, the inner wall surface 16i of the cap 16 generally corresponds in dimension with the outer surface 48a of the port wall 48, e.g., tapers inwardly toward the end wall 52 of the cap 16 to establish a taper or friction fit with the port 46 upon mounting of the cap 16 to the port 46. Other methodologies for securing the cap 16 to the port are also envisioned and include screw threads, bayonet coupling, etc.

At least the beverage receptacle 30 of the container 14 is fabricated in whole, or in part, of a thermally conductive material having the ability to store and transfer thermal energy to the beverage stored within the receptacle chamber. Suitable materials include metals such as stainless steel and aluminum, or thermally conductive polymers.

Figure 7:
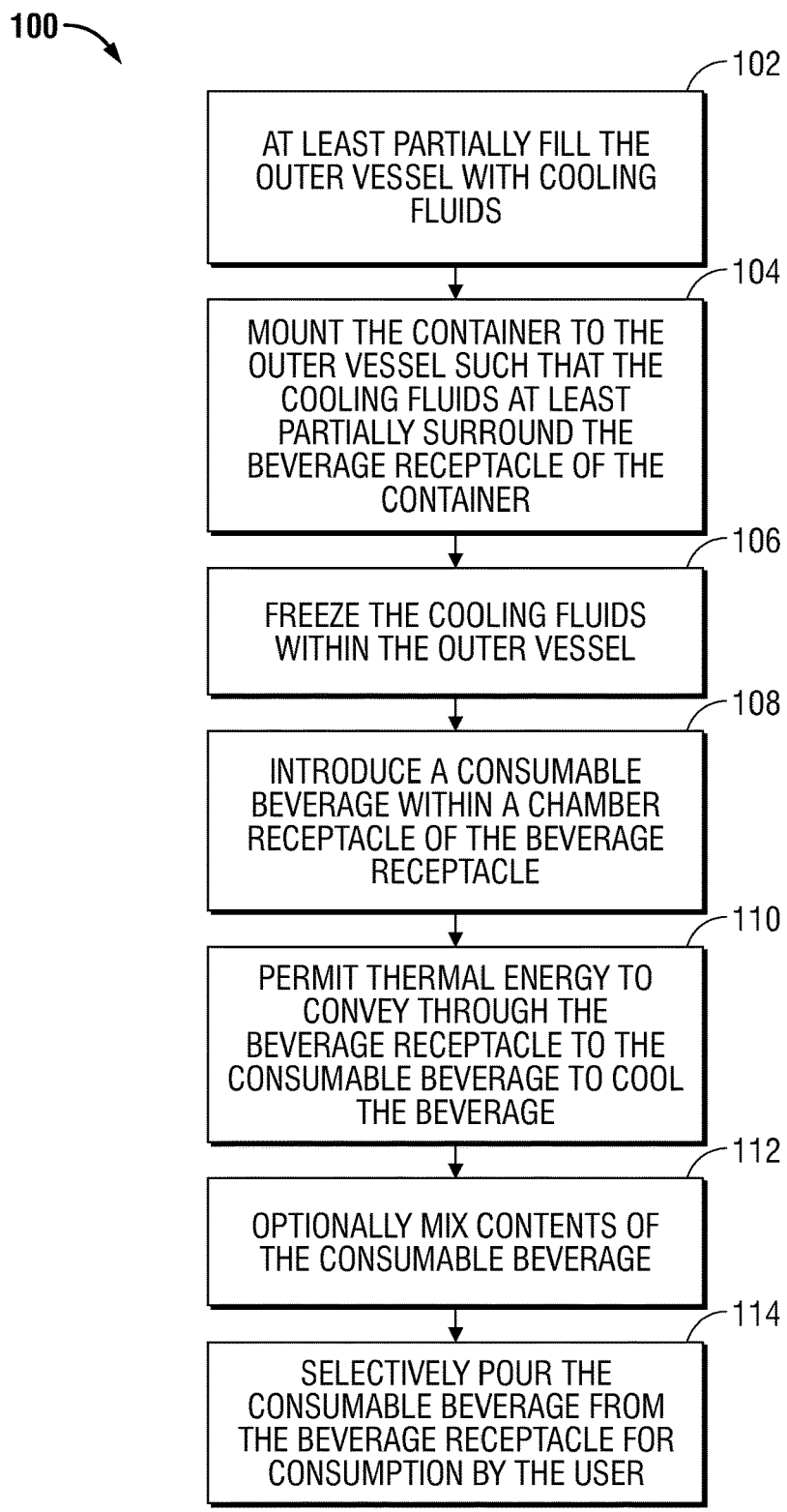
FIG. 7 is a flow chart illustrating a method of use of the apparatus of FIG. 1.

An exemplative use of the apparatus 10 in cooling and maintaining a beverage at a predetermined temperature will now be discussed. With reference to the flow chart 100 depicted in FIG. 7, the user fills the outer vessel 12 with a cooling agent, e.g., water, until the water reaches the "MAX" level indicated in the inner wall surface 18i of the vessel wall 18. (STEP 102) The container 14 is manipulated relative to the outer vessel 12, and the beverage receptacle 30 of the container 14 is advanced within the vessel cavity 20 of the outer vessel 12. The container 14 is advanced until the lid 28 engages the outer vessel 12 in a manner to establish a seal enclosing the vessel cavity 20 and securing the lid 28 at least partially within the interior of the vessel wall 18 thereby mounting the container 14 to the outer vessel 12 as depicted in FIG. 6. (STEP 104) In this mounted condition of the container 14, the cooling agent "a" is displaced to fill the gap 44 between the beverage receptacle 30 and the vessel wall 18 of the outer vessel 12 thereby essentially surrounding the beverage receptacle 30. The outer vessel 12 with the mounted container 14 is then subjected to lower temperatures, e.g., below the freezing temperature of the water, by placement within a freezer apparatus for a predetermined period of time until the water freezes. (STEP 106) The cap 16 may or may not be mounted to the port 46 of the container 14. When it is desired to mix and/or distribute a beverage such as a cocktail including, e.g., alcohol and at least one additional substance, the outer vessel 12 and the mounted container 14 are removed from the freezer apparatus. With the cap 16 removed, the cocktail is poured or introduced within the port opening 50 to at least partially fill the receptacle chamber 42 of the beverage receptacle 30. (STEP 108) The cap 16 may be repositioned on the port 46 of the container 14. The apparatus 10 may be left for a predetermined period of time whereby the thermal energy from the frozen ice conveys through the thermally conductive receptacle wall 38 of the beverage receptacle 30 to cool the beverage "b". (STEP 110). The cocktail may be mixed by shaking the entire apparatus 10 whereby the alcohol and additional component mix within the receptacle chamber 42. (STEP 112) The cap 16 may be removed and the user may selectively pour the beverage "b" from the port 46 of the container 14 when desired. (STEP 114) The frozen ice surrounding the beverage receptacle 30 will maintain the beverage "b" at the desired cool temperature for a substantial period of time, e.g., at least until the ice completely melts and thereafter. The user may selectively pour the beverage "b" as needed. At no time is the beverage diluted by the cooling agent. Specifically, the beverage "b" is contained solely within the receptacle chamber isolated from the cooling agent "a".

The above description and the drawings are provided for the purpose of describing embodiments of the present disclosure and are not intended to limit the scope of the disclosure in any way. It will be apparent to those skilled in the art that various modifications and variations can be made without departing from the spirit or scope of the disclosure. For example, the described method of use of the apparatus 10 is for exemplative purposes only. It is to be appreciated that some of the steps may be performed out of the above-described sequence or concurrently performed. In addition, in lieu of cooling the beverage within the beverage receptacle, it is envisioned that the outer vessel may be filled with a heated thermal agent such as hot or boiling water whereby thermal energy in the form of heat is conveyed through the receptacle wall to the beverage to heat the beverage such as coffee or tea. Other uses are also envisioned. Thus, it is intended that the present disclosure cover the modifications and variations of this disclosure provided they come within the scope of the appended claims and their equivalents.

What is claimed is:

1. An apparatus for accommodating a beverage, which comprises:
    an outer vessel having an interior wall surface defining a vessel cavity for receiving a cooling agent, and extending along a longitudinal axis; and
    a monolithically formed container including:
        a lid and a beverage receptacle, the lid including an outer segment and an insertion segment for reception within the vessel cavity of the outer vessel and configured to releasably mount the container to the outer vessel, the beverage receptacle defining a receptacle chamber for accommodating a liquid beverage for consumption by a user, the receptacle chamber isolated from the vessel cavity, the beverage receptacle comprising a thermal conductive material and being at least partially disposed within the vessel cavity of the outer vessel when the container is mounted to the outer vessel whereby thermal energy is transferred from the cooling agent to the liquid beverage, the beverage receptacle being coaxially arranged within the outer vessel when the container is mounted to the vessel to thereby define an annular spaced gap between the interior wall surface of the outer vessel and the beverage receptacle for accommodating the cooling agent such that the cooling agent at least partially surrounds the beverage receptacle; and
    a port defining a port opening in fluid communication with the receptacle chamber to permit distribution of the liquid beverage to the user, the port being configured to depend outwardly from the lid external of the vessel cavity when the container is mounted to the vessel.

2. The apparatus according to claim 1 including a cap configured to releasably couple to the port to enclose the port opening.

3. The apparatus according to claim 1 wherein the container is formed of a thermally conductive metal.

4. The apparatus according to claim 1 wherein the beverage receptacle is a single wall structure.

5. An apparatus for accommodating a beverage, which comprises:
    an outer vessel having an interior wall surface defining a vessel cavity for receiving a cooling agent, and extending along a longitudinal axis;
    a monolithically formed container including:
        a lid and a beverage receptacle, the lid including an outer segment and an insertion segment for reception within the vessel cavity of the outer vessel and configured to releasably mount the container to the outer vessel, the beverage receptacle defining a receptacle chamber for accommodating a liquid beverage for consumption by a user, the receptacle chamber isolated from the vessel cavity, the beverage receptacle comprising a thermal conductive material and being at least partially disposed within the vessel cavity of the outer vessel when the container is mounted to the outer vessel whereby thermal energy is transferred from the cooling agent to the liquid beverage; and
    a port defining a port opening in fluid communication with the receptacle chamber to permit distribution of the liquid beverage to the user;
    wherein the lid of the container includes an O-ring seal positioned about the insertion segment configured to establish a sealing relation with the interior wall surface of the outer vessel when the container is mounted to the vessel; and
    wherein at least one of the insertion segment and the O-ring seal is configured to establish a frictional relationship with the inner wall surface of the outer vessel to releasably secure the container to the outer vessel.

6. The apparatus according to claim 5 wherein the container is movable from a release condition entirely removed from the outer vessel to a mounted condition through sliding movement of the insertion segment of the lid into the vessel cavity of the outer vessel along the longitudinal axis whereby the at least one of the insertion segment and the O-ring seal engages the interior wall surface of the outer vessel in secured relation therewith.

7. The apparatus according to claim 6 wherein the outer vessel defines an upper open end, the outer segment of the lid directly engaging the upper open end of the outer vessel in the mounted condition of the lid.

8. The apparatus according to claim 7 wherein the container is movable to the mounted condition through sliding movement without any relative rotational movement between the container and the outer vessel.

9. The apparatus according to claim 6 wherein the beverage receptacle is cylindrically-shaped.

10. The apparatus according to claim 9 wherein at least a longitudinal segment of the outer vessel is tapered, defining an internal dimension which increases from a vessel bottom wall toward the upper open end.

* * * * *